Apr. 3, 1923.
F. PELOSI
1,450,449
FENDER FOR VEHICLES
Filed Mar. 22, 1922
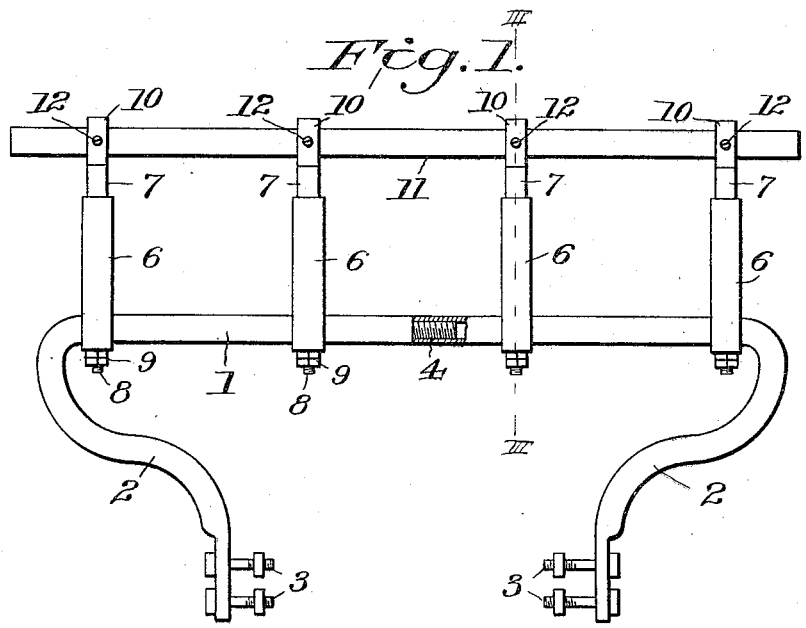
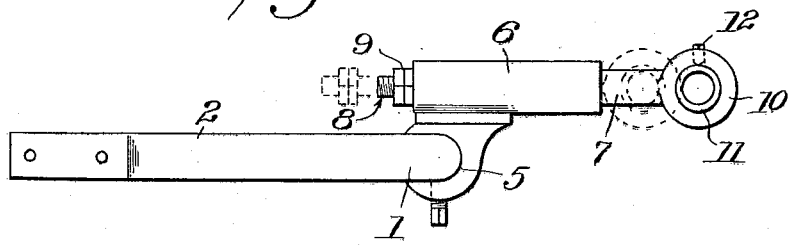
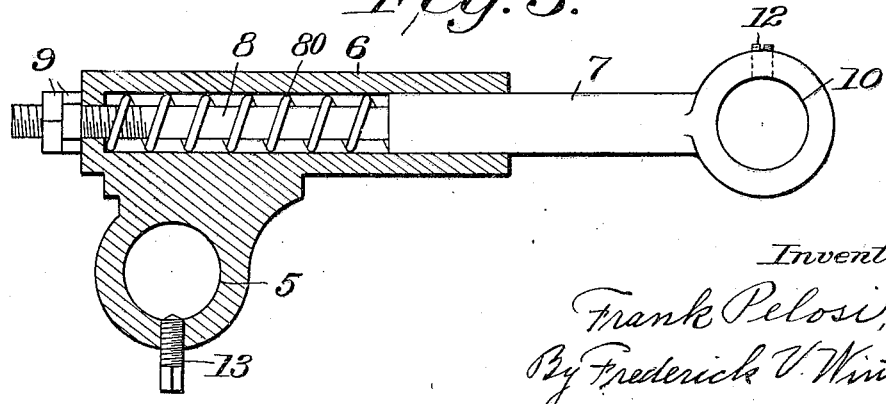
Inventor,
Frank Pelosi,
By Frederick V. Winters
Attorney.

Patented Apr. 3, 1923.

1,450,449

UNITED STATES PATENT OFFICE.

FRANK PELOSI, OF NEW YORK, N. Y.

FENDER FOR VEHICLES.

Application filed March 22, 1922. Serial No. 545,673.

*To all whom it may concern:*

Be it known that I, FRANK PELOSI, a citizen of the United States, residing at New York, in the county and State of New York, have invented certain new and useful Improvements in Fenders for Vehicles, of which the following is a full, clear, and exact specification.

This invention relates to vehicle fenders especially adapted for use on automobiles, and has for its object to provide a fender which is durable, reliable in operation and readily attachable to a vehicle at desired points.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a plan view of a fender constructed substantially in accordance with this invention.

Figure 2 is a side view thereof, and

Figure 3 is a section through one of the telescopic members on the line III—III of Figure 1.

The fender comprises a supporting bar 1 having its ends bent to form brackets 2 adapted to be attached by bolts 3 or other suitable means to the desired points on a vehicle (not shown). Said bar 1 is made in two parts connected together by any suitable form of coupling, as indicated at 4, to allow for the insertion of the bar into eyes 5 cast on tubular socket members 6 a plurality of which are mounted on said bar 1 as illustrated in Figure 1.

Arranged to telescope in the members 6 are push rods 7 having reduced inner end portions 8 extending through the closed inner ends of said socket of cylinder members 6. Coiled springs 8 are mounted around said reduced portions 8 of the push or piston rods 7 for yieldingly holding the same in forwardly extended positions. Nuts 9 on the ends of the reduced portions 8 rearward of the cylinders prevent the disengagement of the piston rods from said cylinders.

At the front ends of the push or piston rods 7 eyes 10 are formed through which a bumper bar 11 is passed, the same being secured by set screws 12 or other suitable means. The eyes 5 on the socket or cylinder members 6 are arranged below said members, as clearly shown in Figures 2 and 3, so that the push rods 7 have free action, as indicated by the dotted lines in Figure 2. Set screws 13 or other suitable means may be provided for securing the eyes 5 at properly spaced intervals on the supporting bar 1.

The shape of the bracket ends 2 of the supporting bar 1 may be varied as may be necessary to attach its bolt-carrying extremities to any desired points on a vehicle. Other details of construction of the device may also be changed without departing from the invention.

I claim:

1. In a vehicle fender, the combination with a bumper bar, of telescopic cushioning members, each having a push rod provided with an eye at its front end, and a socket member having an eye at its rear end, said bumper bar extending through and secured to the eyes on the front ends of said push rods, and a supporting bar extending through and secured to the eyes on the rear ends of all of said socket members, said supporting bar having means for attaching it to a vehicle.

2. In a vehicle fender, the combination with a bumper bar, of a plurality of cushioning members attached at their front ends to said bumper bar, said members having eyes at their rear ends, and a supporting bar arranged parallel to said bumper bar and extending through said eyes of all the cushioning members, said supporting bar being made in detachably connected sections to permit the engagement thereof with said eyes, and also having rearwardly extending brackets at its ends for connection to a vehicle.

3. In a vehicle fender, the combination with a bumper bar, of a plurality of cushioning members attached at their front ends to said bumper bar, said members having eyes at their rear ends, and a supporting bar arranged parallel to said bumper bar and having integral brackets at its ends for connection to a vehicle, said supporting bar being divided intermediate of its ends and detachably connected by a screw and socket connection for the purpose specified.

In testimony whereof I have signed my name to this specification.

FRANK PELOSI.